United States Patent [19]

Marmillion et al.

[11] 4,361,374
[45] Nov. 30, 1982

[54] ELECTRICAL CONNECTOR BAYONET COUPLING PIN

[75] Inventors: David J. Marmillion, Bainbridge; Alan L. Schildkraut, Sidney; David O. Gallusser, Oneonta, all of N.Y.

[73] Assignee: The Bendix Corporation, Southfield, Mich.

[21] Appl. No.: 206,772

[22] Filed: Nov. 14, 1980

[51] Int. Cl.³ .......................................... H01R 13/639
[52] U.S. Cl. ............................ 339/90 R; 339/DIG. 2
[58] Field of Search ............ 339/DIG. 2, 89 R, 89 C, 339/89 M, 90 R, 90 C; 285/396

[56] References Cited

U.S. PATENT DOCUMENTS

| 1,580,639 | 4/1926 | Berg ............................... 339/217 R |
| 2,100,009 | 11/1937 | Hardy, Jr. ........................... 339/90 R |
| 3,182,280 | 5/1965 | Daut et al. ......................... 339/90 R |
| 3,609,632 | 9/1971 | Vetter .................................. 339/14 |
| 3,892,458 | 7/1975 | Clark .................................. 339/90 R |
| 4,168,105 | 9/1979 | Herrmann, Jr. .................. 339/90 R |

FOREIGN PATENT DOCUMENTS

| 2312869 | 12/1976 | France ............................. 339/90 R |
| 1085054 | 9/1967 | United Kingdom . |
| 1200167 | 7/1970 | United Kingdom . |

Primary Examiner—John McQuade
Attorney, Agent, or Firm—Raymond J. Eifler

[57] ABSTRACT

The invention described is a plastic electrical connector characterized by a metal sleeve 20 mounted around the bayonet pin 12 coupling that projects from a connector housing 10.

6 Claims, 4 Drawing Figures

FIG. 1
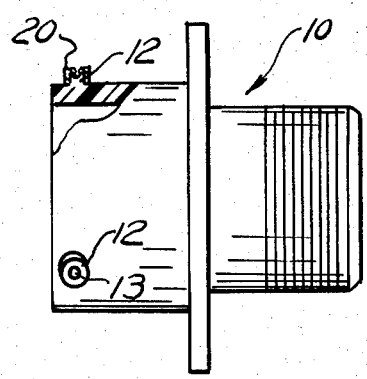
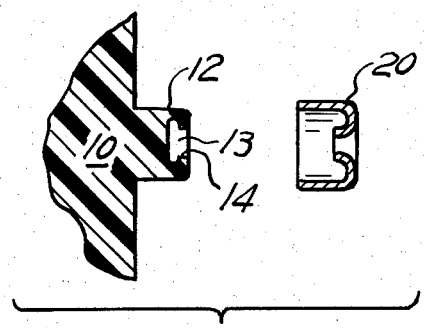
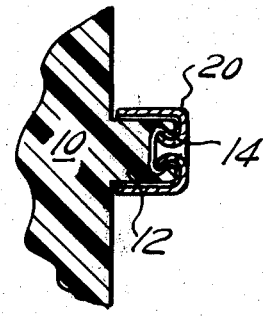
FIG. 2
FIG. 3
FIG. 4
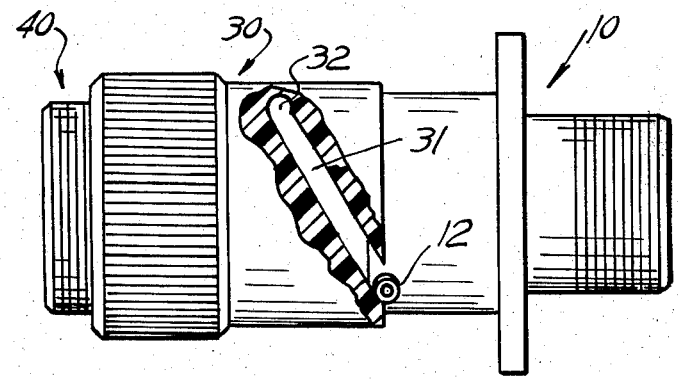

ELECTRICAL CONNECTOR BAYONET COUPLING PIN

This invention relates to an electrical connector assembly of the type having a bayonet coupling.

An electrical connector assembly is generally comprised of two separate housings connected together by a coupling member mounted on one of the housings. In bayonet type couplings the coupling member on one housing includes an internal groove which mates with a pin on the other housing, so that when the coupling member is rotated, the housings are drawn together. Examples of electrical connectors having such bayonet type couplings may be found in U.S. Pat. Nos. 3,551,880, issued Dec. 29, 1970 and entitled "Electrical Connector Having An Improved Locking Means; 3,805,379, issued Apr. 23, 1974 and entitled "Method of Assembling An Electrical Connector to Effect A Preloading Thereof"; and 3,393,927, issued July 23, 1968 and entitled "Electrical Connector". In all of the foregoing patents, the pins described therein are subjected to severe stress and wear during mating with the coupling member. This is especially true in a connector assembly comprised of plastic as is shown in U.S. Pat. No. 3,551,880. In some instances metal pins were molded into the plastic housing, but this makes for a more difficult and lengthy molding process.

DISCLOSURE OF THE INVENTION

This invention reduces the wear on the pin of a bayonet coupling for an electrical connector comprised of plastic.

The invention is a plastic electrical connector characterized by a metal sleeve mounted around the bayonet pin coupling on the connector housing.

One advantage of the invention is that it reduces wear on the bayonet pin coupling.

Another advantage of the invention is that it prevents pieces from being broken off the plastic pin.

Another advantage of the invention is that it avoids the need to mold a metal pin into the connector housing.

DETAILED DESCRIPTION OF THE INVENTION

FIG. 1 illustrates an electrical connector housing utilizing the principles of the invention.

FIG. 2 is an exploded view of a portion of the connector housing shown in FIG. 1.

FIG. 3 is an enlarged cross-sectional view of a portion of FIG. 1.

FIG. 4 illustrates the connector housing showed in FIG. 1 and its initial mating position with another connector housing.

Referring now to the Drawings, FIG. 1 illustrates a connector housing comprised of a one-piece body of molded plastic. At the rear end of the housing 10 there are plurality of connecting threads. At the front end of the housing 10 there are a plurality of electrical contacts mounted therein (not shown) and one or more pins 12 that are adapted to align with grooves in a coupling ring (not shown) for connecting the housing 10 to another connector housing (not shown). Each of the pins 12 includes a recessed portion 13.

FIG. 2 is an exploded view of the pins 12 shown in FIG. 1 and illustrates that each of the pins 12 has a recessed portion 13 that includes an undercut 14. The cap 20 is press fit onto or rolled onto the pin 12.

FIG. 3 illustrates the metal cap 20 mounted to the pin 12 of the connector housing 10. By rolling or pressing a portion of the metal sleeve 20 into the undercut 14 the sleeve 20 is locked onto the pin 12.

FIG. 4 illustrates the housing 10 in its initial mating position with a coupling ring 30 mounted on another connector housing 40. The pin 12 of the housing 10 follows the groove 31 in the coupling ring 30 until it seats in the end portion 32 of the coupling ring 30. Rotational movement of the coupling ring 30 causes the pin 12 to travel along the groove 31 and bring together the housings 10 and 40.

While a preferred embodiment of the invention has been disclosed, it will be apparent to those skilled in the art that changes may be made to the invention as set forth in the appended claims and, in some instances, certain features of the invention may be used to advantage without corresponding use of other features. For instance the pin 12 could include an annular groove in the outside surface thereof for receiving an inwardly extending portion on the sleeve 20 which would retain the sleeve 20 on the pin 12. Accordingly, it is intended that the illustrative and descriptive materials herein be used to illustrate the principles of the invention and not limit the scope thereof.

Having described the invention what is claimed is:

1. In combination with an electrical connector of the type having: a molded plastic housing having a central axis, a forward mating portion and a rear portion; the improvement wherein said housing includes:
   a plastic member integral with said housing and projecting radially outwardly from the outside surface of the forward mating portion of said housing; and
   a thin metal sleeve fixedly mounted around said radially projecting member.

2. The combination as recited in claim 1 wherein said projecting member includes a recess in the outer end thereof, an undercut within the recess, and said metal sleeve includes a portion thereof folded into the undercut to retain said sleeve on said projecting member.

3. In combination with an electrical connector of the type having a first housing having a forward portion; a coupling member mounted to said first housing, said coupling member having a forward portion and a groove on the inside of said forward portion; a second molded plastic housing having a central axis and a forward mating portion adapted to mate with said first housing; and a plastic member integral with said second housing and projecting radially outwardly from the outside surface of the forward mating portion of said second housing, said projecting member adapted to mate with the groove in said coupling member, the improvement comprising:
   a thin metal cap fixedly mounted around said radially projecting member.

4. The combination as recited in claim 3 wherein said projecting member includes a recess in the outer end thereof, an undercut within the recess, and said metal cap includes a portion thereof folded into the undercut to retain said sleeve on said projecting member.

5. In combination with an electrical connector of the type having: a housing having a central axis, a forward mating portion and a rear portion; the improvement wherein said housing includes:
   a member projecting radially outwardly from the outside surface of the forward mating portion of said housing;

a metal sleeve mounted around said radially projecting member; and said projecting member including a recess in the outer end thereof, an undercut within the recess, and said metal sleeve including a portion thereof folded into the undercut to retain said sleeve on said projecting member.

6. In combination with an electrical connector of the type having a first housing having a forward portion; a coupling member mounted to said first housing; said coupling member having a forward portion and a groove on the inside of said forward portion; a second housing having a central axis and a forward mating portion adapted to mate with said first housing; and a member projecting radially outwardly from the outside surface of the forward mating portion of said second housing, said projecting member adapted to mate with the groove in said coupling member, the improvement comprising:

a metal cap mounted around said radially projecting member; and said projecting member including a recess in the outer end thereof, an undercut within the recess, and said metal cap including a portion thereof folded into the undercut to retain said sleeve on said projecting member.

* * * * *